US008811130B1

(12) United States Patent
Takayama et al.

(10) Patent No.: US 8,811,130 B1
(45) Date of Patent: Aug. 19, 2014

(54) METHOD OF MANUFACTURING THERMALLY-ASSISTED MAGNETIC HEAD

(71) Applicant: SAE Magnetics (H.K.) Ltd., Hong Kong (CN)

(72) Inventors: Seiichi Takayama, Hong Kong (CN); Ryuji Fujii, Hong Kong (CN); Osamu Harakawa, Hong Kong (CN); Hideki Tanzawa, Hong Kong (CN); Tadatoshi Koba, Hong Kong (CN); Takashi Honda, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 14/038,160

(22) Filed: Sep. 26, 2013

(51) Int. Cl.
  *G11B 11/00* (2006.01)
  *G11B 5/33* (2006.01)
  *G11B 5/127* (2006.01)

(52) U.S. Cl.
  USPC ............... 369/13.33; 360/313; 29/603.01

(58) Field of Classification Search
  USPC ............ 369/13.03, 13.33, 112.27, 112.23, 369/13.24, 13.14; 360/59, 313; 29/603.01, 29/603.13, 603.03; 228/101
  See application file for complete search history.

(56) References Cited

U.S. PATENT DOCUMENTS

| | | | |
|---|---|---|---|
| 7,898,759 B2 * | 3/2011 | Matsumoto et al. | ............ 360/59 |
| 8,310,903 B1 | 11/2012 | Takayama et al. | |
| 2007/0102485 A1 | 5/2007 | Fukaya et al. | |
| 2011/0228650 A1 | 9/2011 | Shimazawa et al. | |

FOREIGN PATENT DOCUMENTS

JP        10-296434        11/1998

* cited by examiner

*Primary Examiner* — Nabil Hindi
(74) *Attorney, Agent, or Firm* — Nixon & Vanderhye PC

(57) ABSTRACT

A method of manufacturing a thermally-assisted magnetic head includes aligning the light source unit to the thermally-assisted magnetic head section on the slider body; and performing a bonding between the unit substrate and the slider body with a bonding layer in between. And process of the bonding includes irradiating the bonding layer with a first laser shot, pausing for a time interval after the first laser shot, and then irradiating a second laser shot, wherein a first irradiating power of the first laser shot is weaker than a second irradiating power of the second laser shot, and a first irradiating time of the first laser shot is shorter than a second irradiating time of the second laser shot. The method can keep an accurate alignment of the unit substrate with respect to the slider after a bonding process and, in turns improve performance of the thermally-assisted magnetic head.

11 Claims, 13 Drawing Sheets

340  801

METHOD OF MANUFACTURING THERMALLY-ASSISTED MAGNETIC HEAD

FIELD OF THE INVENTION

The present invention relates to a hard disk drive (HDD) with thermally-assisted magnetic heads and, more particularly, to a method of manufacturing a thermally-assisted magnetic head.

BACKGROUND OF THE INVENTION

HDDs are common information storage devices. With improvements in recording density of magnetic HDDs, there has been a demand for improving the performance of magnetic heads and magnetic recording media. In a magnetic hard disk drive, a magnetic head is embedded in a slider that flies above the surface of a magnetic recording medium.

Recently, a technology so-called thermal assisted magnetic recording has been proposed, and a thermal assisted magnetic head also has been put to use. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization.

Commonly, the heat source comes from the thermal assisted magnetic head. FIG. 1a shows a perspective view of a conventional thermal assisted magnetic head 100. The thermal assisted magnetic head 100 includes a slider body 110 having an air bearing surface (ABS) (not shown, under) processed so as to provide an appropriate flying height and a light source unit 130 mounted on the slider body 110. The slider body 110 includes a bottom surface 112 opposite the ABS, a trailing edge 113 where read and write elements 115 are embedded, and a leading edge (not shown, back) opposite the trailing edge 113. The light source unit 130 is mounted on the position where the write elements are embedded via a bonding layer. The light source unit 130 includes a laser diode 131 located near the write element and a mounting base 132 for supporting the laser diode 131. The mounting base 132 is bonded to the slider body 110 by using a solder layer, for example. The laser diode 131 emits a laser light to a portion of the magnetic recording medium, which reduces the medium's coercivity. After that, writing is performed by applying write magnetic field to the heated portion; therefore the writing operation is facilitated.

FIG. 1b shows a conventional manufacturing method of a thermally-assisted magnetic head. In the process of manufacturing the thermally-assisted magnetic head including the laser diode, the unit substrate and the slider as described above, it is important that the unit substrate be accurately positioned with respect to the slider and secured thereto so that emitted light from the laser diode will be accurately incident on the incidence end of the waveguide.

U.S. Patent Application Publication No. 2011/0228650 A1 discloses a positioning and bonding method that allows the unit substrate to be positioned with respect to the slider and secured thereto in the following manner. In the positioning and bonding method, emitted light from the laser diode is allowed to be incident on the incidence end of the waveguide, the intensity of light emitted from the emitting end of the waveguide is detected, and the unit substrate is positioned with respect to the slider so that the aforementioned intensity becomes maximum. Subsequently, the unit substrate is irradiated with heating laser light that is projected to pass through the unit substrate, so that the solder interposed between the slider and the unit substrate is heated and melted by the heating laser light. After that, the irradiation with the heating laser light is stopped to solidify the solder to thereby allow the unit substrate to be secured to the slider. FIG. 1c shows the irradiating time and the irradiating power during the bonding process.

Now, problems with the positioning and bonding method above will be described. In the method above, there may occur misalignment of the unit substrate with respect to the slider in the process of melting and then solidifying the solder to thereby secure the unit substrate to the slider.

Accordingly, it is desired to provide improved method of manufacturing a thermally-assisted magnetic head to overcome the above-mentioned drawbacks.

SUMMARY OF THE INVENTION

One objective of the present invention is to provide a method of manufacturing a thermally-assisted magnetic head, thereby keeping an accurate alignment of the unit substrate with respect to the slider after a bonding process and, in turns improving performance of the thermally-assisted magnetic head.

To achieve above objective, a method of manufacturing a thermally-assisted magnetic head includes:

providing a slider body and a light source unit, the slider body including a thermally-assisted magnetic head section, and the light source unit including a unit substrate and a light source mounted on the unit substrate;

aligning the light source unit to the thermally-assisted magnetic head section on the slider body; and performing a bonding between the unit substrate and the slider body with a bonding layer in between;

wherein process of the bonding comprises irradiating the bonding layer with a first laser shot, pausing for a time interval after the first laser shot, and then irradiating a second laser shot, wherein a first irradiating power of the first laser shot is weaker than a second irradiating power of the second laser shot, and a first irradiating time of the first laser shot is shorter than a second irradiating time of the second laser shot.

As a preferred embodiment, the first irradiating power is in a range from 0.1 kw to 0.25 kw, and the first irradiating time is in a range from 20 ms to 35 ms; the second irradiating power is in a range from 1.0 kw to 1.4 kw, and the second irradiating time is in a range from 8 ms to 12 ms; and the time interval is in a range from 10 ms to 300 ms.

As another embodiment, further includes forming the bonding layer on a surface of the slider body beforehand, wherein the length of the bonding layer is larger than that of the joint surface of the unit substrate.

Preferably, the width of the bonding layer is smaller than that of a joint surface of the unit substrate, and two end portions of the bonding layer along its lengthwise direction are remained to support the unit substrate after bonding.

Alternatively, the edges of the joint surface of the unit substrate are located within boundaries of the bonding layer after bonding.

As one more embodiment, further includes forming the bonding layer on a surface of the slider body beforehand, wherein the bonding layer includes a main bonding layer and at least two accessorial bonding layers with smaller size symmetrically formed at two sides of the main bonding layer along its widthwise direction.

Preferably, the length of the main bonding layer is larger than that of a joint surface of the unit substrate, and the length of the accessorial bonding layer is smaller than that of the joint surface of the unit substrate.

Optionally, edges of the accessorial bonding layers are overlapped with boundary of the joint surface of the unit substrate.

Preferably, edges of the accessorial bonding layers are located within boundaries of the joint surface of the unit substrate.

Preferably, the thickness of the bonding layer is in a range from 320 nm to 480 nm before bonding, and the joint surface of the unit substrate is embedded in the slider body with an embedding depth of 40 nm~60 nm after bonding.

In comparison with the prior art, as the manufacturing method of the present invention applies two-time laser shot, the first time uses the weaker irradiating power for a longer time to cause the bonding layer half-molten, so as to provide a small bonding force between the unit substrate and the slider body without any shift of the light source unit or misalignment, and pausing for a certain time interval after the first laser shot to generate a temporary joint between the unit substrate and the slider body, and then the second time uses the stronger irradiating power for a shorter time to cause the bonding layer molten completely, so as to provide a lager bonding force to enhance the joint between the unit substrate and the slider body without any shift or misalignment.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
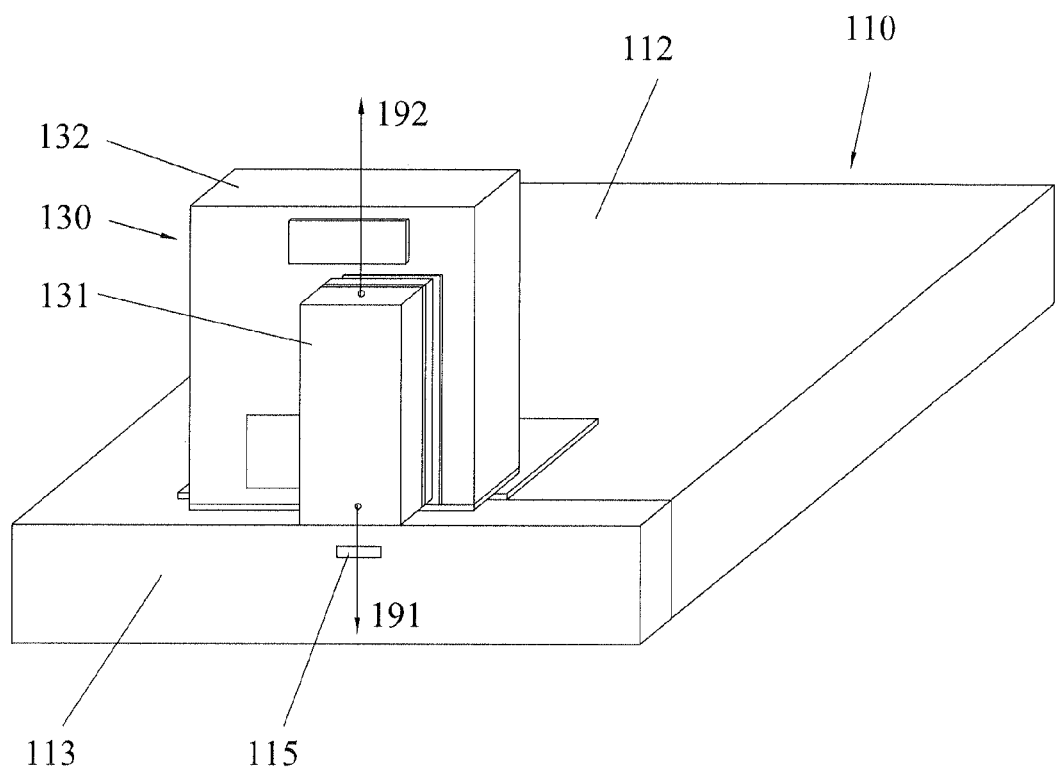
FIG. 1a is a partial exploded perspective view of a conventional thermally-assisted magnetic head.
Figure 1B:
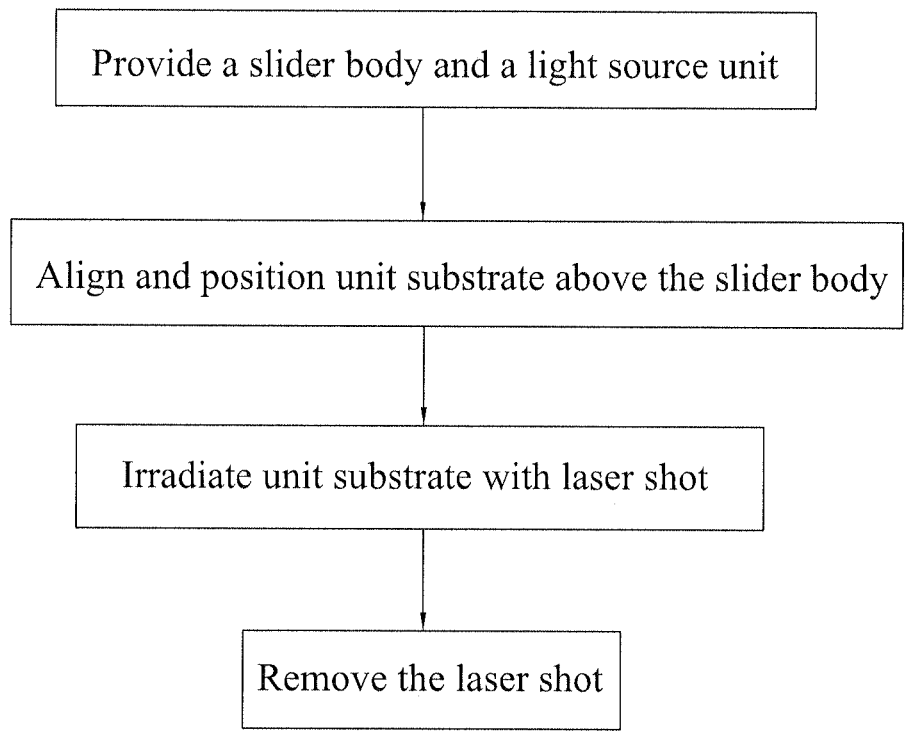
FIG. 1b is a simplified flowchart of a conventional method of manufacturing thermally-assisted magnetic head.
Figure 1C:
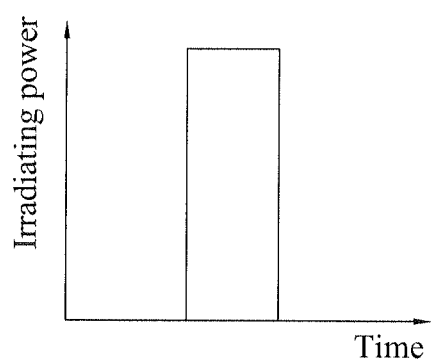
FIG. 1c shows irradiating time and the irradiating power during the bonding process.

Various preferred embodiments of the invention will now be described with reference to the figures, wherein like reference numerals designate similar parts throughout the various views. As indicated above, the invention is directed to a method of manufacturing a thermally-assisted magnetic head, thereby keeping an accurate alignment of the unit substrate with respect to the slider after a bonding process and meanwhile ensuring a stable bonding and, in turns improving performance of the thermally-assisted magnetic head.

Figure 2:
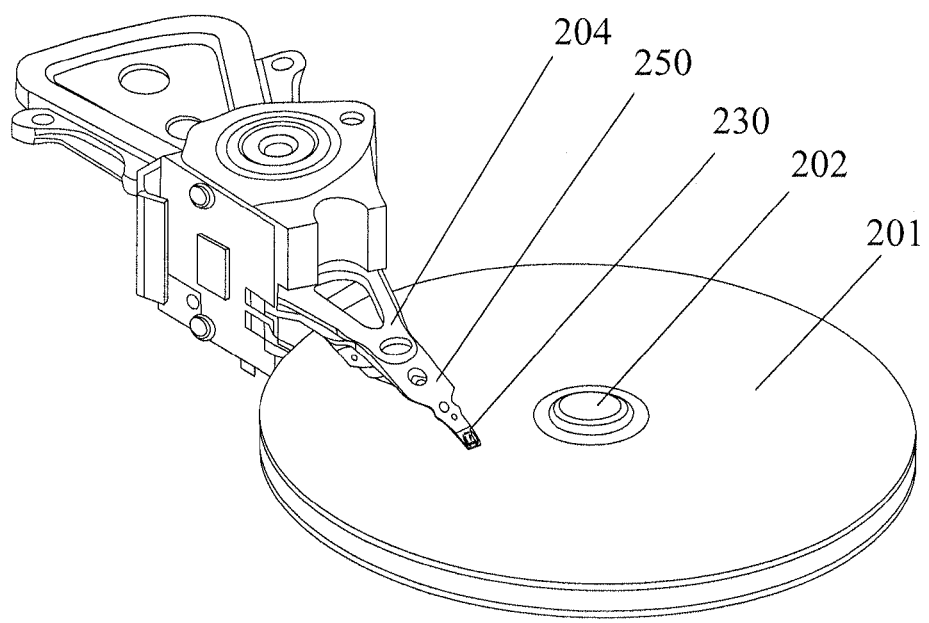
FIG. 2 is a perspective view of a hard disk drive with thermally-assisted magnetic heads according to one embodiment of the present invention.

FIG. 2 is a perspective view of the hard disk drive of the present invention. As shown, a hard disk drive 200 contains a number of rotatable magnetic disks 201 attached to a spindle motor 202, a set of drive arms 204 and HGAs 250 mounted on the ends of the drive arms 204. Typically, a VCM is provided for controlling the motion of the drive arm 204.

Figure 3:
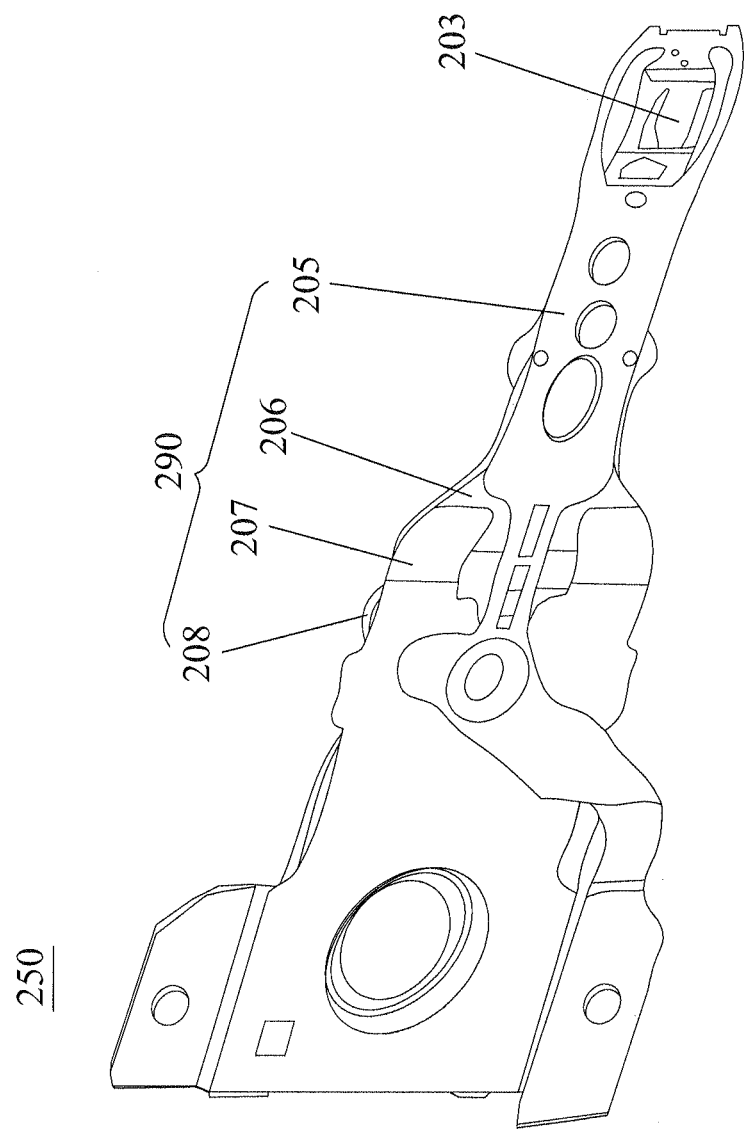
FIG. 3 is a perspective view of a head gimbal assembly with a thermally-assisted magnetic head according to one embodiment of the present invention.

Referring to FIG. 3, the HGA 250 contains a thermally-assisted magnetic head 230 and a suspension 290 for supporting the thermally-assisted magnetic head 230. The suspension 290 includes a load beam 206, a base plate 208, a hinge 207 and a flexure 205, all of which are assembled with each other. The hinge 207 has a mounting hole (not shown) formed thereon to assemble the hinge 207 to the base plate 208. As the main structure of the HGA 250 is known to the persons skilled in the art, thus is omitted here. Specifically, the thermally assisted head 230 is carried on the flexure 205.

Figure 4:
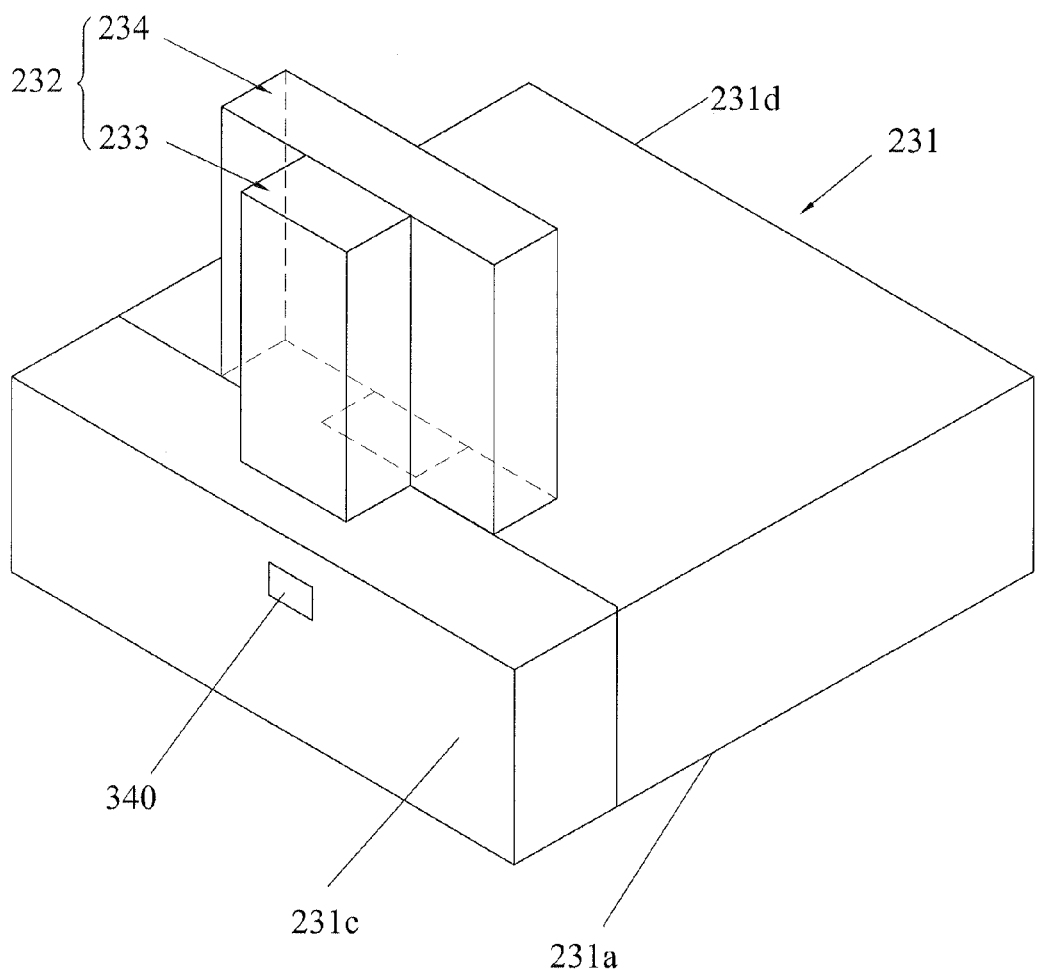
FIG. 4 is a perspective view of a thermally-assisted magnetic head according to one embodiment of the present invention.

Referring to FIG. 4, the thermally-assisted magnetic head 230 according to the present invention is illustrated. The thermally-assisted magnetic head 230 includes a slider body 231 and a light source unit 232 formed on the slider body 231 for thermally assisted magnetic recording. The light source unit 232 includes a light source 233 and a unit substrate 234 for supporting the light source 233. In the present embodiment, the slider body 231, the light source 233, and the unit substrate 234 are generally rectangular shaped.

As shown, the slider body 231 has an ABS 231a, a bottom surface 231b opposite to the ABS 231a, a trailing edge 231c, a leading edge 231d opposite to the trailing edge 231c, and two side surfaces (not labeled). The ABS 231a facing to the disk is processed so as to provide an appropriate flying height, and a thermally-assisted magnetic head section 340 is embedded in the trailing edge 231c. The trailing edge 231c has multiple bonding pads (not shown) to connect with a suspension 290 of the HGA 250. Specifically, the light source unit 232 is mounted on the bottom surface 231b, for emitting laser light to facilitate writing.

Figure 5:
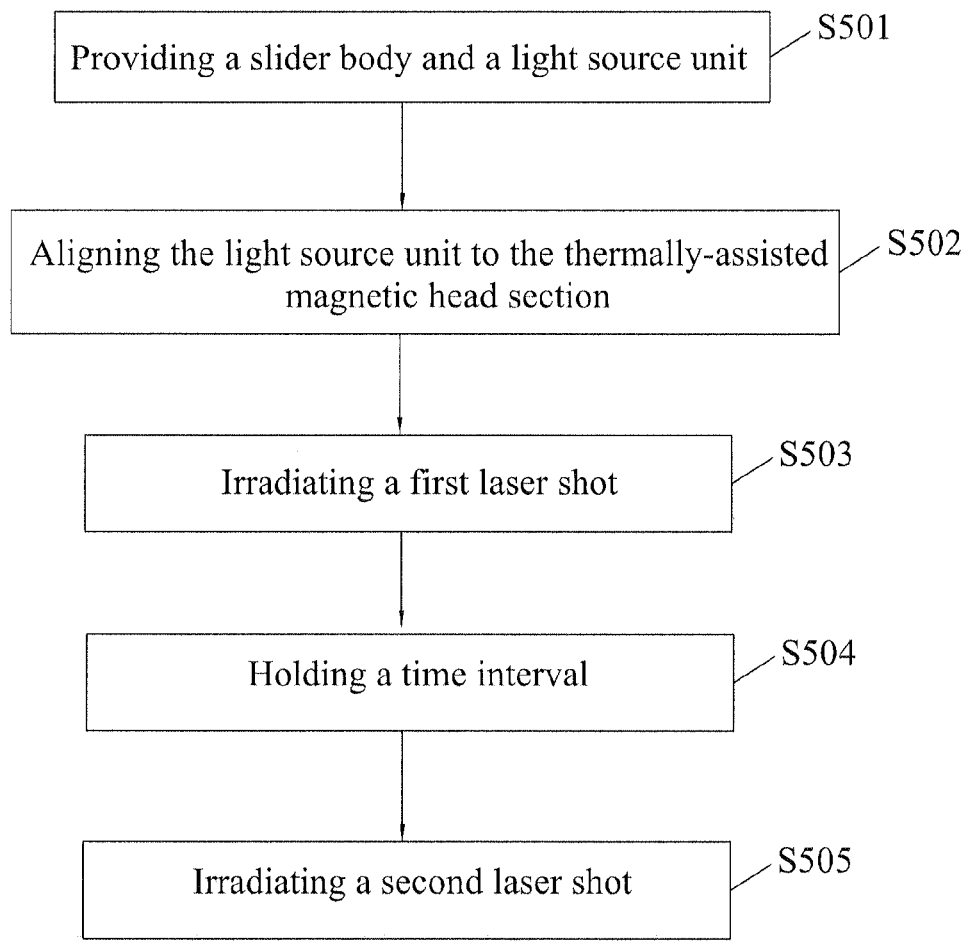
FIG. 5 is a flowchart of a method of manufacturing a thermally-assisted magnetic head according to one embodiment of the present invention.

FIG. 5 shows a simplified flowchart of a method of manufacturing a thermally-assisted magnetic head according to one embodiment of the present invention. The manufacturing method is performed in individual slider-level, which includes the following steps at least:

S501, providing a slider body and a light source unit;

S502, aligning the light source unit to the thermally-assisted magnetic head section;

S503, irradiating a first laser shot with higher power to the bonding layer therebetween for a shorter time. Concretely, the first irradiating power of the first laser shot is in a range of 0.1 kw~0.25 kw, and the first irradiating time is in a range of 20 ms~35 ms. Such a first irradiating power is applied to cause the bonding layer half-molten, so as to provide a small bonding force between the unit substrate and the slider body without any shift of the light source unit or misalignment.

S504, holding a time interval. Concretely, the time interval is in a range of 10 ms~400 ms. Preferably, 300 ms for example. Such a time interval is helpful to generate a temporary joint between the unit substrate and the slider body after the first laser shot.

S505, irradiating a second laser shot with weaker power to the bonding layer for a longer time. Concretely, the second irradiating power of the second laser shot is in a range of 1.0 kw~1.4 kw, and the second irradiating time is in a range of 8 ms~12 ms. Such a second irradiating power with weaker power and shorter time is applied to cause the bonding layer molten completely, so as to provide a lager bonding force to enhance the joint between the unit substrate and the slider body without any shift or misalignment.

Figure 6:
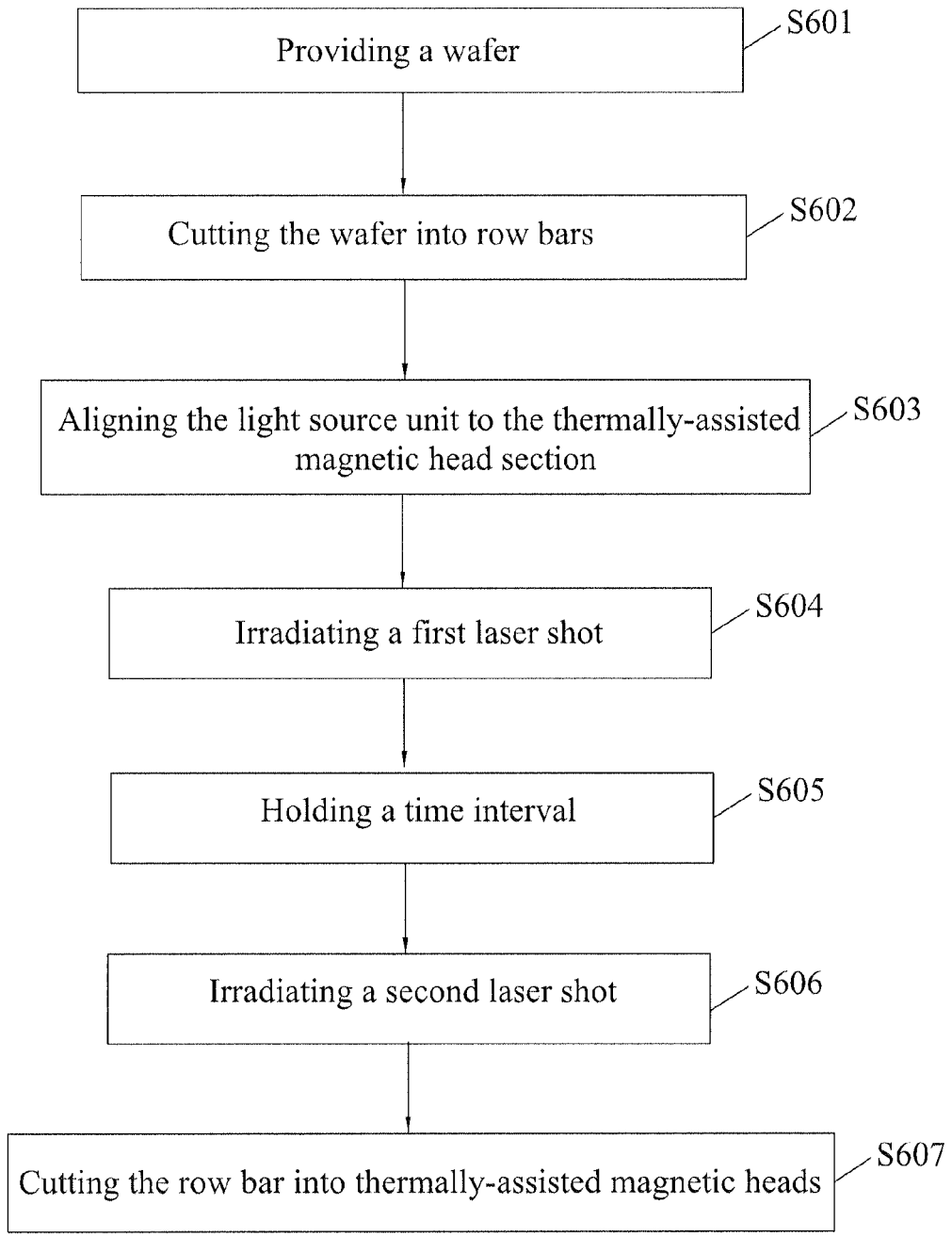
FIG. 6 is a flowchart of a method of manufacturing a thermally-assisted magnetic head according to another embodiment of the present invention.

FIG. 6 shows a simplified flowchart of a method of manufacturing a thermally-assisted magnetic head according to a preferred embodiment of the present invention. The manufacturing method of the present embodiment is performed in row bar level, which can improve producing yield. The method includes the following steps:

S601, providing a wafer with numbers of row bar arranged;

S602, cutting the wafer into individual row bars with numbers of thermally-assisted magnetic head slider body;

S603, aligning each light source unit to each thermally-assisted magnetic head section on the row bar;

S604, irradiating the first laser shot to the bonding layer in between;

S605, holding a time interval;

S606, irradiating the second laser shot to the bonding layer;

S607, cutting the row bar into individual thermally-assisted magnetic heads.

In the embodiments, the laser shot is emitted by YAG (yttrium aluminum garnet) laser.

Figure 7:
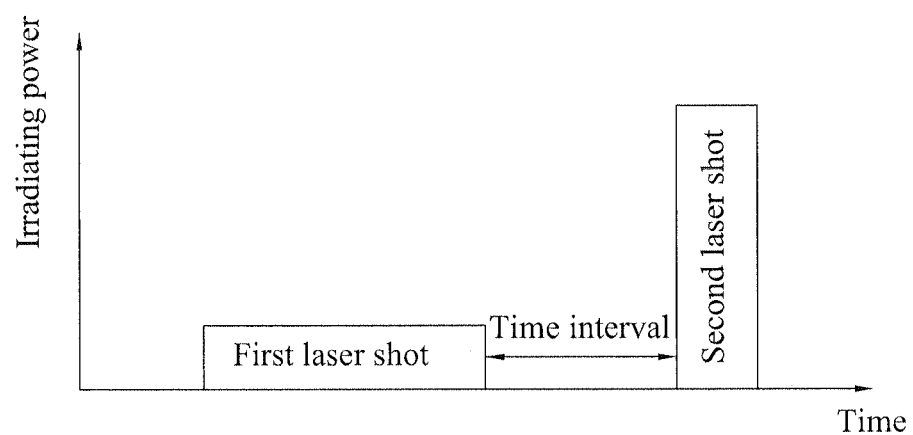
FIG. 7 shows irradiating time and the YAG power during two-time laser shot of the bonding process.

FIG. 7 is shows irradiating time and the irradiating YAG power during two-time laser shot of the bonding process, by which principle of bonding is shown distinctly. And table 1 shows the numbers of sample experiments for two-time laser shot of the bonding process, to show the controls of the first and second irradiating power and time, and the time interval, and bonding force, position shift and yield resulted by the irradiating process.

FIG. 8 to FIG. 12b are perspective views depicting main steps in the method of manufacturing the thermally-assisted magnetic head as mentioned in FIG. 6, respectively, and detailed descriptions of other steps mentioned in FIG. 6 are conventional and omitted here therefore.

Figure 8:
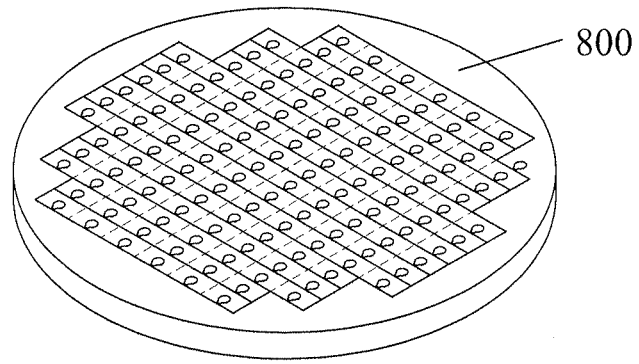
FIG. 8 is a perspective view depicting one step in a method of manufacturing the thermally-assisted magnetic head as shown in FIG. 6.

As shown in FIG. 8, a wafer 800 configured of, for example, AlTiC is first prepared. The wafer 800 eventually becomes a plurality of sliders. Subsequently, a plurality of magnetic reading/recording head sections 340 are formed in an array on the wafer 800 by using conventional procedures which are well known to person ordinarily skilled in the art and omitted therefore.

Figure 9:
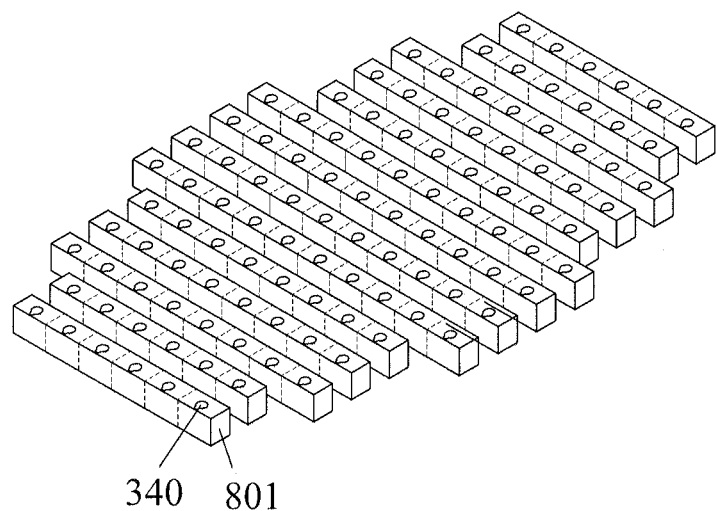
FIG. 9 is a perspective view depicting one step following FIG. 8.
Figure 10:
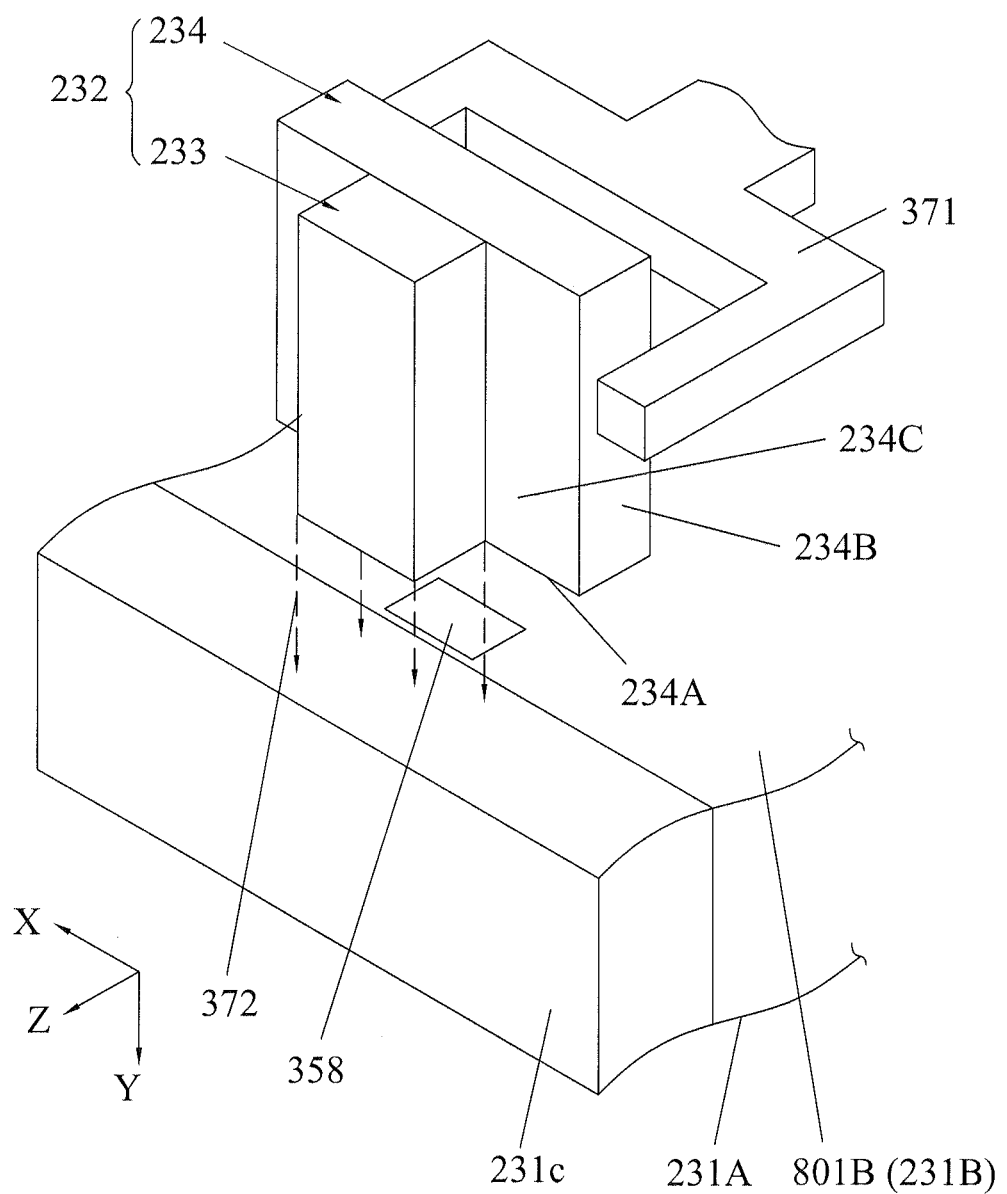
FIG. 10 is a perspective view depicting one step following FIG. 9.
Figure 11:
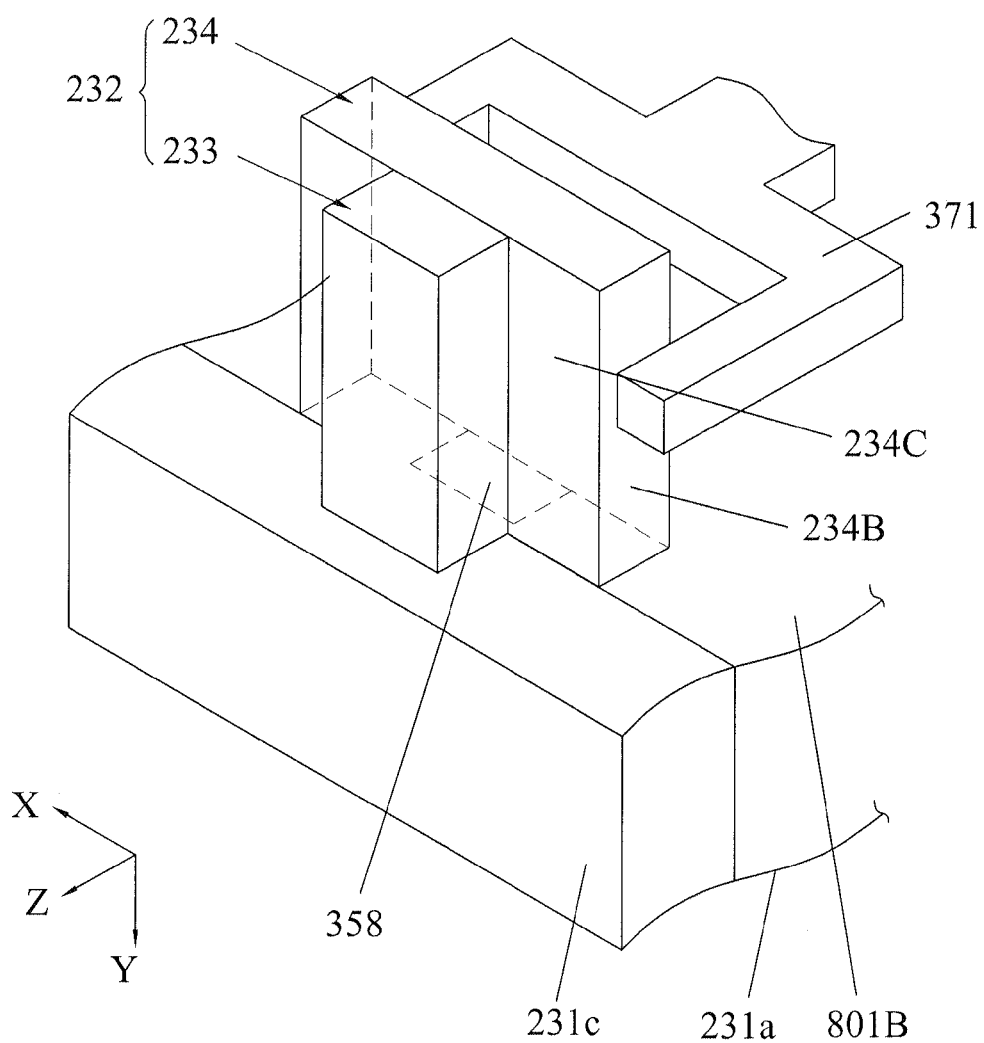
FIG. 11 is a perspective view depicting one step following FIG. 10.

The wafer 800 is cut to form a plurality of row bars 801 as shown in FIG. 9. On the row bars 801, a plurality of magnetic head sections 340 are formed in a line. Further, mechanical polishing is performed on one end face of the bar 801 followed by selective etching using the photolithographic technique or the like to form the ABS 231a.

Subsequently, the light source units 232 are prepared to bond them at each predetermined position on the row bars 801 following the procedures given below.

Specifically, in the first place, a bonding layer 358 is formed using, for example, a vapor deposition technique at a predetermined position on a rear surface 801B of the row bar 801 that is eventually used as a rear surface 231b of the slider body 231. The bonding layer 358 is used for bonding the light source units 232 to the slider body 231. The bonding layer 358 is formed of, for example, solder, i.e., Sn (tin) element, or alloy containing Sn, Pb (lead), or Bi (bismuth). More specifically, it can be an alloy containing SnAu, SnCu, SnAl, SnSi, SnGe, SnMg, SnPb, SnAg, SnZn, SnBi, SnNi, SnPt, PbAu, PbMg, PbBi, BiAu, and others. Incidentally, the bonding layer 358 may be provided on a junction surface 234A of a unit substrate 234 in opposition to the rear surface 801B.

Next, the row bar 801 is placed on a stage (not shown in the figure) of an alignment apparatus, and thereafter the light source unit 232 is attached to a probe 371 of the alignment apparatus. At this time, the junction surface 234A of the unit substrate 234 is placed in opposition to the rear surface 801B of the row bar 801. Then, a given voltage is applied across terminal electrodes (not shown) of the light source 233 to emit a laser beam 372 from a luminescent center (not shown) of the active layer. On this occasion, the light source unit 232, the row bar 801, and the element forming layer 231c are separated from each other at predetermined intervals, being mov-

TABLE 1

| YAG condition | | | | | Result | | | | Yield(Bonding force > 100 gf, and Position shift < 0.6 um) |
|---|---|---|---|---|---|---|---|---|---|
| 1st shot | | | 2nd shot | | Bonding force | | Position shift | | |
| Power (kW) | Time (ms) | Time interval | Power (kW) | Time (ms) | After 1st shot | After 2nd shot | After 1st shot | After 2nd shot | |
| 0.25 | 30 | 300 | 1 | 10 | 145 | 205 | 0.35 | 0.31 | 100% |
| 0.25 | 30 | 300 | 1.2 | 10 | 89 | 198 | 0.21 | 0.29 | 100% |
| 0.25 | 30 | 300 | 1.4 | 10 | 57 | 180 | 0.33 | 0.33 | 100% |
| 0.2 | 30 | 10 | 1 | 10 | 112 | 175 | 0.26 | 0.28 | 100% |
| 0.2 | 30 | 10 | 1.2 | 10 | 89 | 165 | 0.2 | 0.28 | 100% |
| 0.2 | 30 | 10 | 1.4 | 10 | 104 | 198 | 0.31 | 0.31 | 100% |
| 0.15 | 30 | 300 | 1 | 10 | 69 | 156 | 0.31 | 0.30 | 100% |
| 0.15 | 30 | 10 | 1.2 | 10 | 69 | 178 | 0.3 | 0.29 | 100% |
| 0.15 | 30 | 10 | 1.4 | 10 | 80 | 160 | 0.27 | 0.33 | 100% |
| 0.1 | 30 | 300 | 1 | 10 | 45 | 185 | 0.25 | 0.39 | 100% |
| 0.1 | 30 | 300 | 1.2 | 10 | 60 | 169 | 0.2 | 0.29 | 100% |
| 0.1 | 30 | 300 | 1.4 | 10 | 61 | 194 | 0.29 | 0.36 | 100% | able relatively in the X-axis direction (track width direction) and Z-axis direction. Under such a condition, while keeping emitting the laser beam 372 and moving the light source unit 232 toward the X-axis direction (track width direction) and Z-axis direction, the near-field light NF from the end face exposed to the ABS 231a on the plasmon generator (not shown) is detected sequentially by means of an optical receiver element (not shown in the figure). Specifically, the laser beam 372 from the luminescent center is incident onto the rear end face of the waveguide (not shown), and subsequently is propagated through the waveguide to reach the vicinity of the plasmon generator (not shown). A surface plasmon is generated in the plasmon generator, which is propagated toward the ABS 231a to eventually concentrate on a pointed end, resulting in the near-field light NF being generated from the pointed end. Movement of the light source unit 232 toward the X-axis direction and Z-axis direction is stopped at a position where the intensity of the near-field light NF to be detected by the optical receiver element has a maximum value. Afterward, the light source unit 232 is moved toward the Y-axis direction while keeping the relative position of the X-axis direction and Z-axis direction to come into contact with the bar 801 via the bonding layer 358 as shown FIG. 11. This completes alignment of the light source unit 232 and the bar 801 as well as that and the element forming layer 231A.

Figure 12:
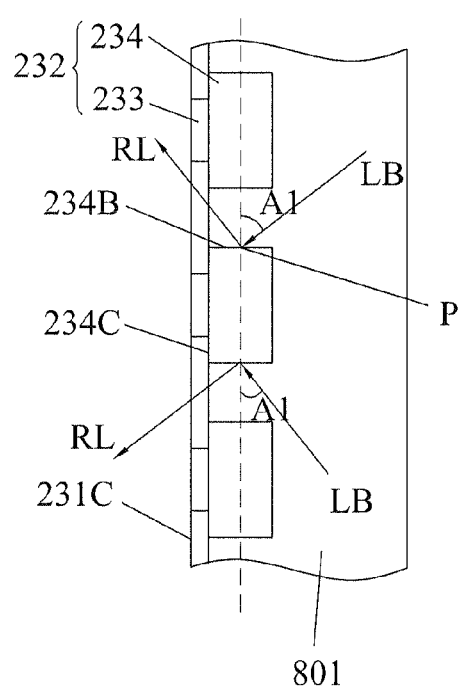
FIG. 12a~12b are perspective views depicting one step following FIG. 11.
Figure 12:
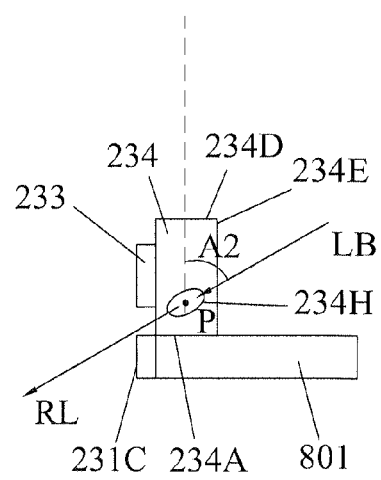

Subsequently, as shown in FIG. 12 (a) and FIG. 12 (b), in a first irradiating laser shot, a laser beam LB with a predetermined wavelength transmitting through the unit substrate 234 is irradiated to both side surfaces 234B on the unit substrate 234. As an example of the laser beam LB1, the Nd-YAG laser light (λ=1064 nm) can be used. This heats the unit substrate 234. At an irradiation position P and its adjacent location on the both side surfaces 234B of the unit substrate 234, an irradiation mark 234H is formed by the irradiation of the laser beam LB. The irradiation mark 234H has an elliptical planar shape in which the traveling direction of the laser beam LB as a major axis, being a pothole-shaped portion with gradually increasing depth along the traveling direction of the laser beam LB. Incidentally, FIG. 12 (b) is a top view with a plurality of light source units 232 placed in line on the bars 801 viewed from above. FIG. 12(b) is a side view with an arbitrary light source unit 232 viewed from the lateral side.

Here, as shown in FIG. 12(a), the laser beam LB is irradiated to the unit substrate 234 obliquely from behind. In other words, the laser beam LB is irradiated in a direction having a vector component along the Z-axis direction proceeding from the rear surface (surface on the opposite side of a light source 233 mounting surface 234C) 234E of the unit substrate 234 toward the light source mounting surface 234C. When a trajectory of the laser beam LB is projected on a plane (XZ plane) parallel to the rear surface and junction surface 234A, an incident direction of the laser beam LB forms the angle A1 relative to a lineup direction (X-axis direction) of the light source units 232. Even if a protective means such as a light shielding plate is not provided, therefore, damage of the bars 801 due to reflective light RL of the laser beam LB from (the irradiation position P) on the side surface 234B can be avoided. Further, since the laser beam LB is radiated from the dead angle direction where the light source mounting surface 234C is hidden from view, it is unlikely that the light source 233 which is mounted on the light source mounting surface 234C could be damaged by erroneous irradiation (caused by displacement or the like) of the laser beam LB.

Additionally, as shown in FIG. 12 (b), the laser beam LB is irradiated obliquely from behind, that is, in the direction having a vector component along the Y-axis direction proceeding from the top surface (surface on the opposite side of the junction surface 234A) 234D of the unit substrate 234 toward the junction surface 234A. Therefore, compared with the case where a vector component along the Y-axis direction in the laser beam LB is zero, the heat energy that is propagated from the irradiation position P to the bonding layer 358 increases. Here, the laser beam LB may be desirably incident at an angle A2 that allows to avoid the reflective light RL from the irradiation position P from being incident onto the bar 801 and the element forming layer 231C. This is because damage of the bar 801 and the element forming layer 231C due to the reflective light RL is avoided. Incidentally, the angle A2 is an angle that the incident direction of the laser beam LB forms relative to the Y-axis direction orthogonal to the junction surface 234A and the rear surface 231B (801B).

Concretely, the laser beam LB of the first laser shot provides a first irradiating power that is in a range of 0.1 kw~0.25 kw, for example 0.2 kw preferably, and the first irradiating time is in a range of 20 ms~35 ms, for example 30 ms preferably. After the first laser shot, the bonding layer 358 is in half-molten status, and a small bonding force is generated between the unit substrate 234 and the slider body 231, and at the same time, the relative position of the unit substrate 234 and the slider body 231 fails to change or shift due to the appropriate irradiating power and irradiating time. Subsequently, pausing for a time interval such as in a range of 10 ms~300 ms, and then perform the second irradiating laser shot. Such a time interval is helpful to generate a temporary joint between the unit substrate 234 and the slider body 231 after the first laser shot without any shift or misalignment.

In the second irradiating laser shot, the laser beam LB provides a irradiating power that is in a range of 1.0 kw~1.4 kw, for example 1.2 kw preferably, and keep it for a time in a range of 8 ms~12 ms, for example 10 ms preferably, so as to enhance bonding force. Through heat conduction from the unit substrate 234 that is heated by the irradiation of the laser beam LB, the bonding layer 358 on which the energy is exerted melts completely. Subsequently, the melted bonding layer 358 becomes solidified quickly by stopping the irradiation of the laser beam LB. As a result, the unit substrate 234 for the light source unit 232 and the slider body 231 are bonded with accurate positional relationship maintained.

In conclusion, the manufacturing method of the present invention applies two-time laser shot, the first time uses the weaker irradiating power for a longer time to cause the bonding layer half-molten, so as to provide a small bonding force between the unit substrate 234 and the slider body 231 without any shift of the light source unit 232 or misalignment, and pausing for a certain time interval after the first laser shot to generate a temporary joint between the unit substrate 234 and the slider body 231, and then the second time uses the stronger irradiating power for a shorter time to cause the bonding layer molten completely, so as to provide a lager bonding force to enhance the joint between the unit substrate 234 and the slider body 231 without any shift or misalignment.

To further enhance the joint effect of the light source unit 232 and the slider body 231, inventors makes improvements on the bonding layer and the arrangement/configuration of the bonding layer and the joint surface 234A of the unit substrate 234. FIG. 13a~13d shows different patterns and arrangements of the bonding layer 358 and the joint surface 234A of the unit substrate 234 before they are bonding. For convenient to describe, the joint surface 234A of the unit substrate 234 is illustrated in dashed.

Figure 13:
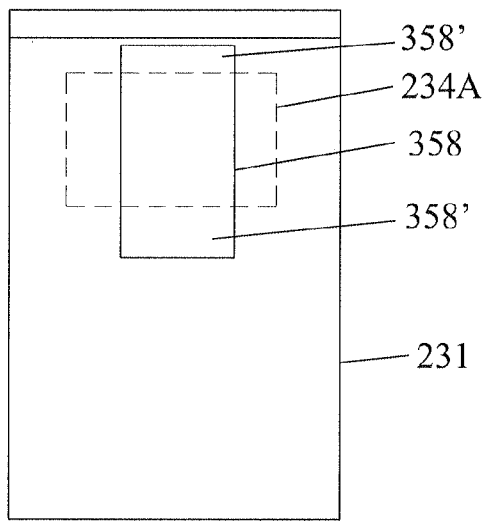
FIGS. 13a~13d show different patterns and arrangements of the bonding layer and the joint surface of the unit substrate before bonding.
Figure 13:
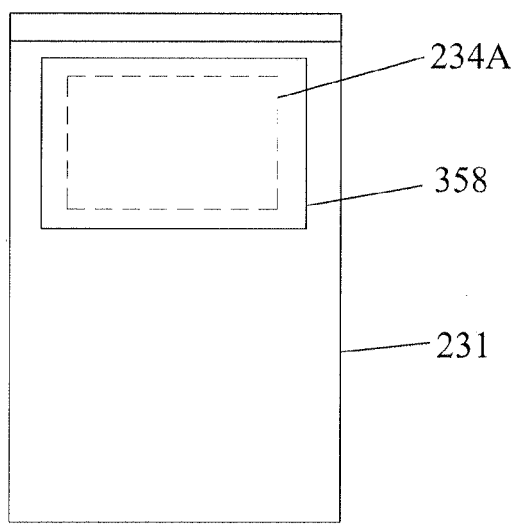
Figure 13:
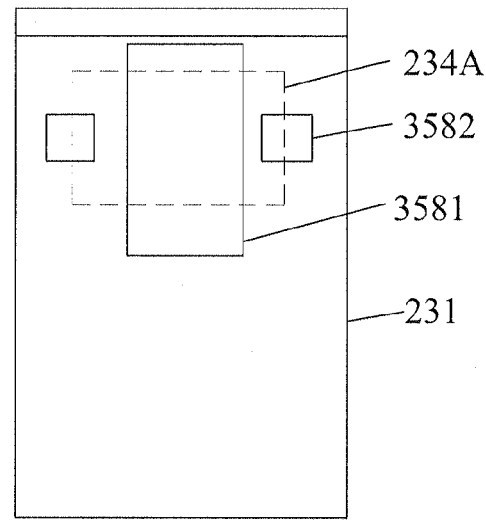
Figure 13:
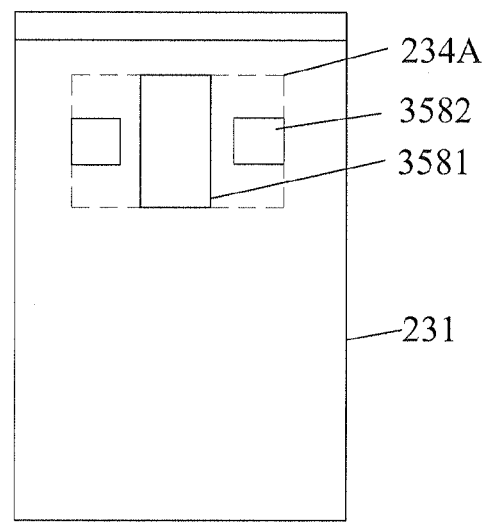

In these embodiments, the bonding layer 358 and the joint surface 234A of the unit substrate 234 are rectangular substantially, but not limited. Referring to FIG. 13a, the length (arrow Y defines the lengthwise direction) of the bonding layer 358 is larger than that of the joint surface 234A of the unit substrate 234, the width (arrow X defines the widthwise direction) of the bonding layer 358 is smaller than that of the joint surface 234A of the unit substrate 234. The bonding layer 358 is overlapped with the boundaries of the joint surface 234A of the unit substrate 234, so that two end portions 358' of the bonding layer 358 along the lengthwise direction are remained to support the unit substrate 234 after bonding. By such an arrangement, the unit substrate 234 is clamped and urged by the two end portions 358', therefore the bonding is more stable.

Preferably, the bonding layer 358 has a thickness of 320 nm~480 nm, preferably 400 nm. And after bonding by the laser beam, the light source unit 232 is bonded on the slider body 231 with a part of the unit substrate 234 is embedded in the slider body 231 due to thermal effect, and the embedded depth is 40 nm~60 nm, about 50 nm for example.

As an alternative embodiment, as illustrated in FIG. 13b, the area of the bonding layer 358 is larger than that of the joint surface 234A of the unit substrate 234, and the edges of the joint surface 234A of the unit substrate 234 are located within boundaries of the bonding layer 358 after bonding. This arrangement is helpful to reduce negative impact generated by the slider's heat expansion effect due to the high temperature during irradiating laser shot.

As improved embodiments modified by the embodiments shown in FIG. 13a, referring to FIGS. 13c~13d, the bonding layer 358 includes a main bonding layer 3581 and at least two accessorial bonding layers 3582 with smaller size symmetrically formed at two sides of the main bonding layer 3581 along its widthwise direction. The length of the main bonding layer 3581 is larger than that of the joint surface 234A of the unit substrate 234, and the length of the accessorial bonding layer 3582 is smaller than that of the joint surface 234A of the unit substrate 234. Specifically, the edges of the accessorial bonding layers 3582 are overlapped with boundary of the joint surface 234A of the unit substrate 234. Alternatively, the edges of the accessorial bonding layers are located within boundaries of the joint surface 234A of the unit substrate 234. The bonding between the light source unit 232 and the slider body 231 is more stable.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of manufacturing a thermally-assisted magnetic head, the method comprising:
    providing a slider body and a light source unit, the slider body including a thermally-assisted magnetic head section, and the light source unit including a unit substrate and a light source mounted on the unit substrate;
    aligning the light source unit to the thermally-assisted magnetic head section on the slider body; and
    performing a bonding between the unit substrate and the slider body with a bonding layer in between;
    wherein process of the bonding comprises irradiating the bonding layer with a first laser shot, pausing for a time interval after the first laser shot, and then irradiating a second laser shot, wherein a first irradiating power of the first laser shot is weaker than a second irradiating power of the second laser shot, and a first irradiating time of the first laser shot is shorter than a second irradiating time of the second laser shot.

2. The method according to claim 1, wherein the first irradiating power is in a range from 0.1 kw to 0.25 kw, and the first irradiating time is in a range from 20 ms to 35 ms; the second irradiating power is in a range from 1.0 kw to 1.4 kw, and the second irradiating time is in a range from 8 ms to 12 ms; and the time interval is in a range from 10 ms to 300 ms.

3. The method according to claim 1, further comprising forming the bonding layer on a surface of the slider body beforehand, wherein the length of the bonding layer is larger than that of the joint surface of the unit substrate.

4. The method according to claim 3, wherein the width of the bonding layer is smaller than that of a joint surface of the unit substrate, and two end portions of the bonding layer along its lengthwise direction are remained to support the unit substrate after bonding.

5. The method according to claim 3, wherein the edges of the joint surface of the unit substrate are located within boundaries of the bonding layer after bonding.

6. The method according to claim 1, further comprising forming the bonding layer on a surface of the slider body beforehand, wherein the bonding layer includes a main bonding layer and at least two accessorial bonding layers with smaller size symmetrically formed at two sides of the main bonding layer along its widthwise direction.

7. The method according to claim 6, wherein the length of the main bonding layer is larger than that of a joint surface of the unit substrate, and the length of the accessorial bonding layer is smaller than that of the joint surface of the unit substrate.

8. The method according to claim 6, wherein edges of the accessorial bonding layers are overlapped with boundary of the joint surface of the unit substrate.

9. The method according to claim 6, wherein edges of the accessorial bonding layers are located within boundaries of the joint surface of the unit substrate.

10. The method according to claim 1, wherein the thickness of the bonding layer is in a range from 320 nm to 480 nm before bonding.

11. The method according to claim 1, wherein the joint surface of the unit substrate is embedded in the slider body with an embedding depth of 40 nm~60 nm after bonding.

* * * * *